United States Patent
Mitra

(12) United States Patent (10) Patent No.: US 7,042,996 B1
Mitra (45) Date of Patent: May 9, 2006

(54) METHOD AND APPARATUS FOR CAS-BASED RING LIMITING OF FXS PORTS

(75) Inventor: Somnath Mitra, San Leandro, CA (US)

(73) Assignee: Cisco Technology, Inc., San Jose, CA (US)

( * ) Notice: Subject to any disclaimer, the term of this patent is extended or adjusted under 35 U.S.C. 154(b) by 666 days.

(21) Appl. No.: 09/848,123

(22) Filed: May 2, 2001

(51) Int. Cl.
*H04M 3/62* (2006.01)

(52) U.S. Cl. .......................... 379/207.16; 379/112.04; 379/418

(58) Field of Classification Search ........... 379/207.16, 379/252–255, 181, 211.03, 418, 413.01, 221.03, 379/112.04, 112.05, 221.07, 179
See application file for complete search history.

(56) References Cited

U.S. PATENT DOCUMENTS

| | | | | |
|---|---|---|---|---|
| 4,907,256 A | * | 3/1990 | Higuchi et al. | 379/137 |
| 5,367,567 A | * | 11/1994 | Sugawara | 379/252 |
| 6,028,919 A | * | 2/2000 | Bingel et al. | 379/142 |
| 6,278,778 B1 | * | 8/2001 | Abdollahi et al. | 379/373.01 |
| 6,351,528 B1 | * | 2/2002 | Apfel | 379/377 |
| 6,584,197 B1 | * | 6/2003 | Boudreaux et al. | 379/413.02 |

* cited by examiner

*Primary Examiner*—William J. Deane, Jr.
(74) *Attorney, Agent, or Firm*—Sierra Patent Group, Ltd.

(57) ABSTRACT

A method and apparatus for call-limiting one or more candidate calls received by a router is disclosed. The method and apparatus may be configured to determine whether ringing one or more candidate calls will exceed a predetermined power limit. If ringing the calls will not exceed said power limit, the calls may be forwarded. If ringing the calls will exceed the power limit, the calls may be placed in a queue.

30 Claims, 10 Drawing Sheets

METHOD AND APPARATUS FOR CAS-BASED RING LIMITING OF FXS PORTS

BACKGROUND

1. Field of the Invention

The present disclosure relates to data communications, and, in particular, to routers.

2. The Prior Art

BACKGROUND

The ability to transport large amounts of critical data over a network in a reliable manner is of critical importance today. Applications such as streaming video, live audio, or teleconferencing all place high demands on networks such as the Internet. When a system carrying such data crashes, critical communications may be lost, revenues lost, productivity affected and users frustrated.

Figure 1:
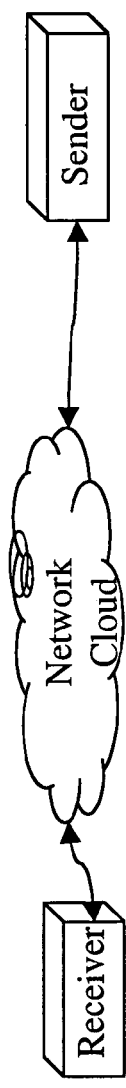

FIG. 1 shows an example of a prior art communication system. FIG. 1 shows a sender and a receiver connected to a network cloud. For purposes of this disclosure, the sender and receiver may be any standard electronic devices which desire to communicate through an electronic network such as the Internet, a Local Area Network (LAN), or a Wide Area Network (WAN).

To the end user, the operation of the system in FIG. 1 should be transparent and error free. For example, an end user (receiver) watching streaming video originating from a video server (sender) should never know what is taking place within the network cloud that makes the process possible.

Figure 2:
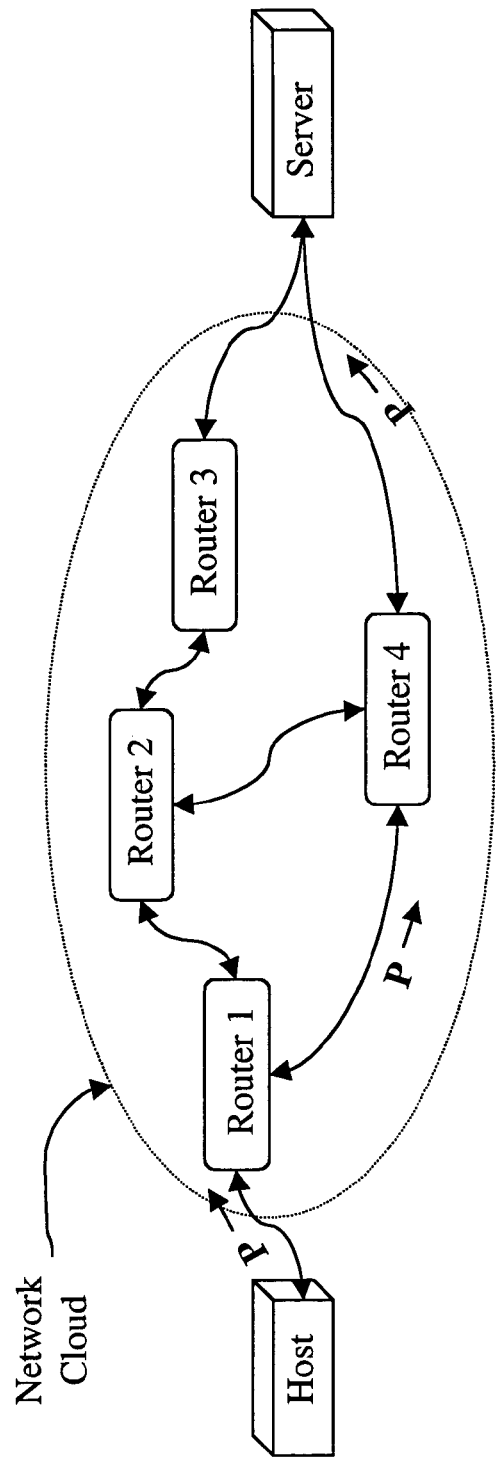

FIG. 2 is a more detailed diagram of a prior art communications system. FIG. 2 expands on the detail of FIG. 1 by showing an example of communications occurring over a standard Internet connection. FIG. 2 includes a host and a server connected to a network cloud comprising a plurality of routers. In FIG. 2, the host wishes to transmit a packet P to the server. As is known by those of ordinary skill in the art, when the packet P arrives at router 1, the router 1 will encode the packet P with a unique identifier containing the source and destination addresses. Then router 1 will forward the packet P onto the destination through other routers according to standard routing protocols. In this example, router 1 will forward packet P onto router 4, which will then forward the packet P onto the ultimate destination, which in our example here is the server.

One application of the Internet that is seeing wider use in small and medium-sized businesses is Internet-based telephony. As the backbone of the Internet continues to be upgraded and expanded, the promise of a low-cost substitute to the traditional PBX system may now be realized.

One type of Internet-based telephony system that is gaining acceptance is IP telephony, which transfers voice information over the Internet Protocol (IP) of the TCP/IP protocol suite. While many standards exist, such as Voice over Packet (VOP) for Frame Relay and ATM networks, as used herein the term "IP telephony" will be used to designate voice over any packet-based network. In IP telephony, a user wishing to communicate uses an IP telephone, which is a device which transports voice over a network using data packets instead of the traditional switched circuits of a voice only network.

Figure 3:
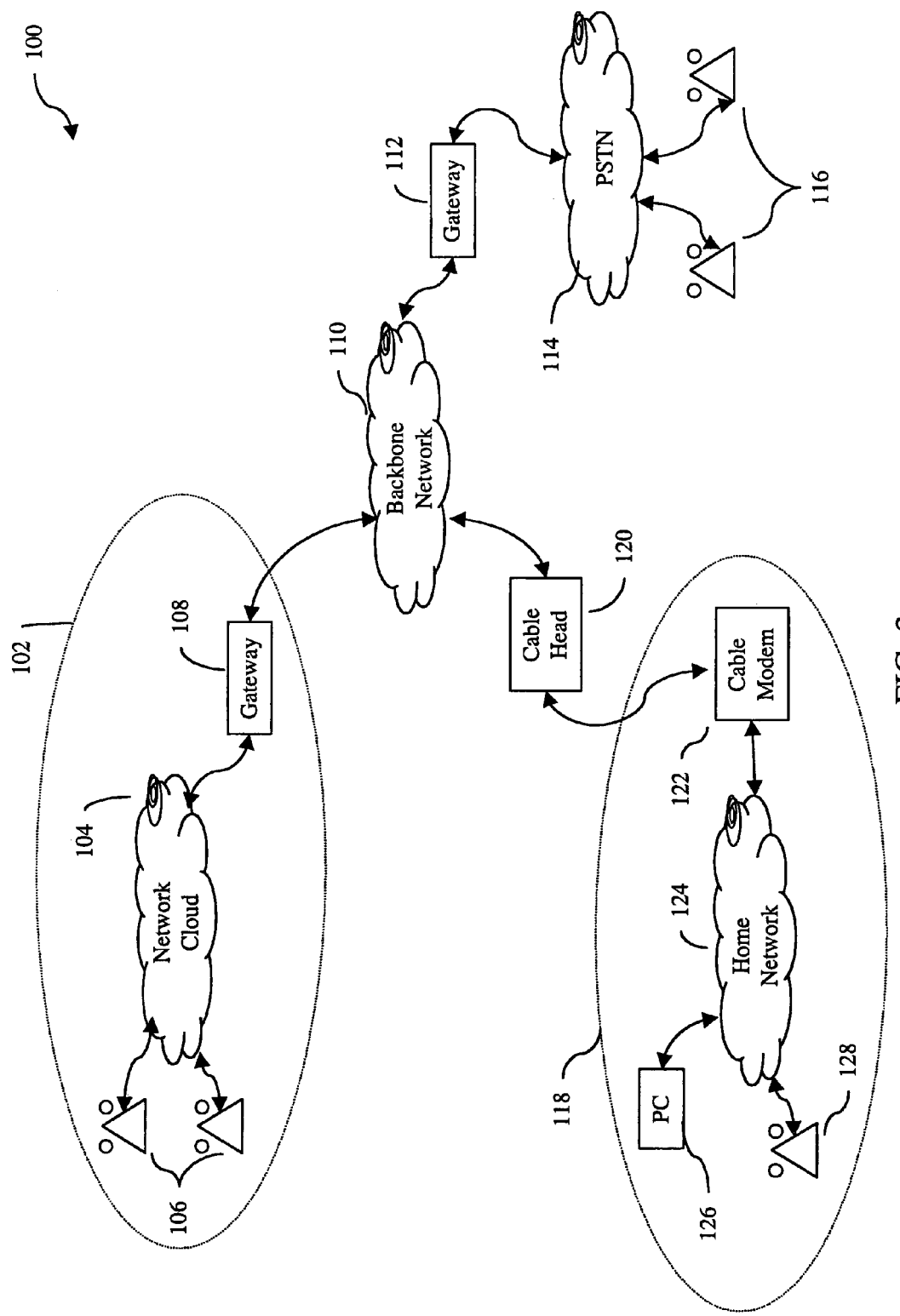

FIG. 3 shows an IP telephony system 100 of the prior art. System 100 includes a business system 102 configured to provide IP telephony in an enterprise environment. Business system 102 may include a network 104, such as a corporate Ethernet LAN, to which a plurality of IP telephones 106 may be operatively coupled to network 104 using hardware and software standard in the art. To couple the business system 102 to the outside world, typically a gateway 108 standard in the art is provided and operatively coupled between network 104 and backbone network 110.

Backbone network 110 may be any packet-based network standard in the art, such as IP, Frame Relay, or ATM. To provide voice communications to legacy POTS phones, typically a gateway 112 is provided, which may be a VoP gateway. Gateway 112 provides access to the Public Switched Telephone Network (PSTN) 114. Through PSTN 114, voice-only communications may be provided to legacy POTS phones 116.

The system 100 of FIG. 3 also includes an example of a broadband residential system 118. To reach individual residences, typically local ISP providers provide a cable or DSL head end 120 standard in the art. An individual wishing to utilize the ISP's service may then employ a cable modem or DSL modem 122 coupled to the user's home LAN 124. The user's home LAN may be provided by a home PC 126 configured to run software standard in the art such as Microsoft Windows®. The user may then operatively couple an IP telephone 128 to the LAN 124.

Thus, in the system 100 of FIG. 3, IP telephones 106 in business system 102 may communicate by voice with other similar business systems similarly configured with IP telephones. For a business enterprise, communication by IP telephony may be advantageous because the need for a traditional PBX system can be eliminated. Furthermore, an IP telephony system is scalable and may be upgraded along with the enterprise's network system.

Key to providing routers to small and medium-sized enterprises is manufacturing reliable routers at the lowest cost possible. Prior art routers provided to large enterprises are often complex in operation and expensive.

Figure 4:
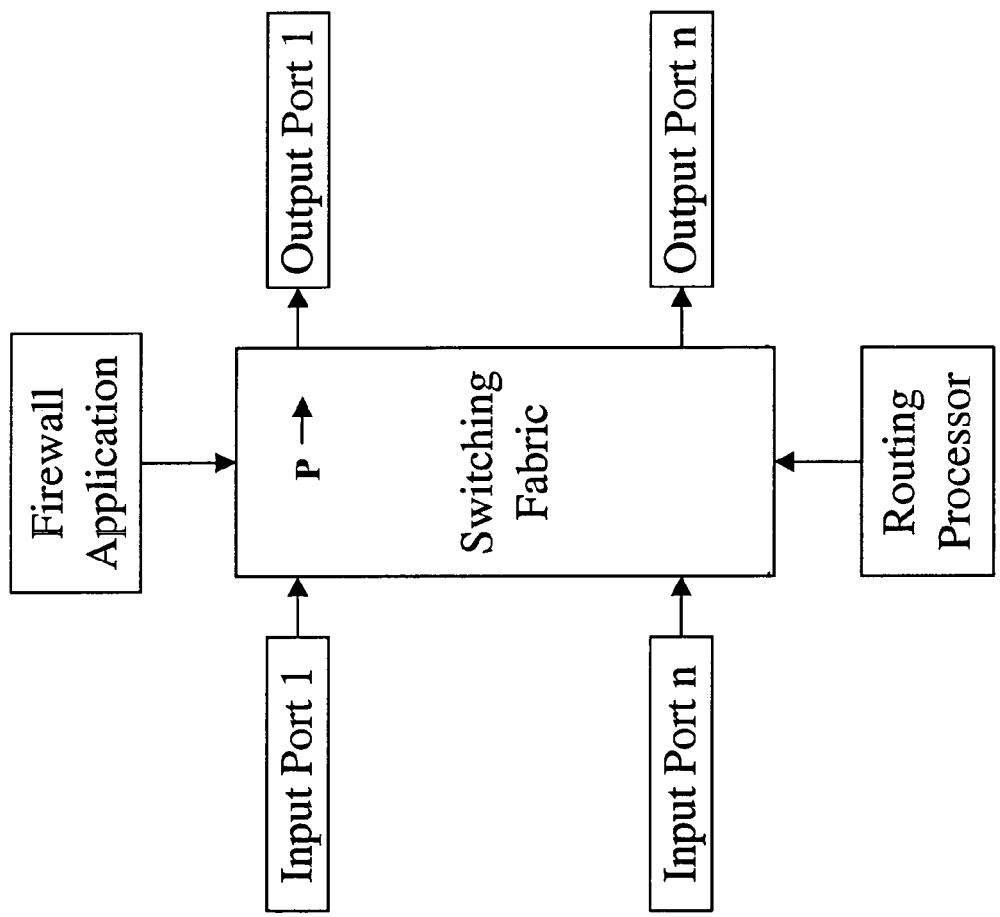

FIG. 4 is a conceptual block diagram of a typical prior art router. A typical prior art router may have a plurality of input ports and a plurality of output ports connected through a switching fabric which forms the heart of the router. Routers will typically contain a routing processor containing standard hardware and software, and may also contain a firewall application standard in the art as shown in FIG. 4.

In operation, when a packet appears at an input port such as input port 1 in FIG. 4, the firewall application will first examine the packet to see if the packet is safe to route through. If the packet is safe, then the routing processor will route the packet through the switching fabric to the appropriate output port, such as output port 1 as shown in FIG. 4.

As is known by those of ordinary skill in the art, the switching fabric contained within a high-end router comprises fast but expensive semiconductor switches which places such a router out of reach for smaller enterprises.

In order to satisfy smaller enterprises serving 20–50 people, lower cost routers have been developed which utilize software-based switches instead of a switching fabric.

Figure 5:
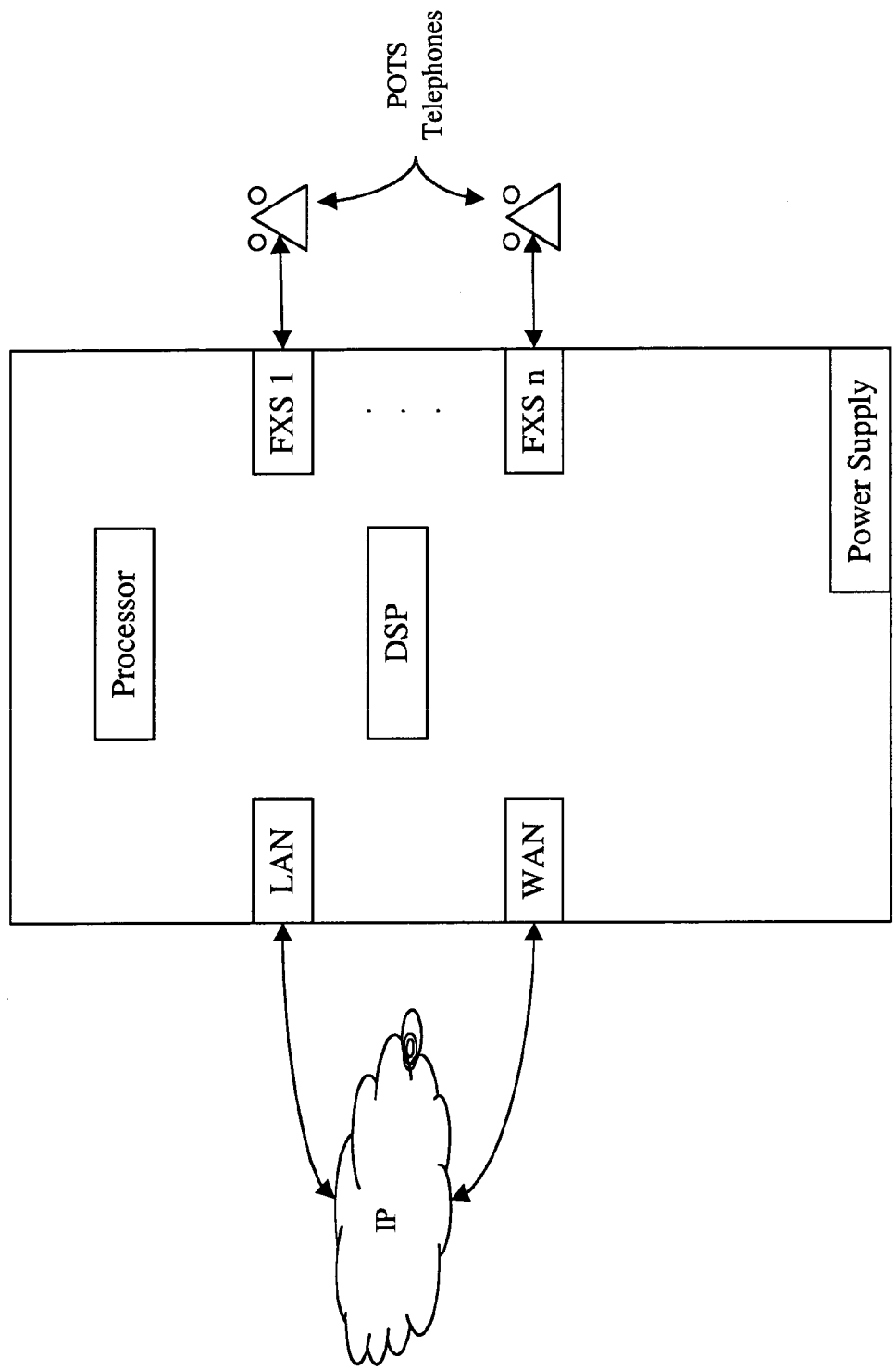

FIG. 5 shows a conceptual diagram of a prior art software-based router. The router of FIG. 5 includes a central processor, such as a Motorola 860 Power PC. The router may be coupled to a LAN, such as an Ethernet-based network, and a WAN, such as a T1 line. The router may also be coupled to an IP cloud through either the LAN or WAN.

One or more POTS phones may also be coupled to the router through Foreign Exchange Station (FXS) ports 1 through n. The router may also include a digital signal processor (DSP) for interfacing the FXS ports with the processor. Typically, the DSP is configured to detect when a POTS phone is "off-hook", or picked up from its cradle. Furthermore, the DSP is configured to detect and translate the DTMF tones produced when a caller dials a number on the phone.

Finally, the router of FIG. 5 may also include a power supply for providing all necessary power requirements for the router. Additionally, the power supply also must provide power to the POTS phones coupled to the router's FXS ports.

However, to produce low-cost routers, many design tradeoffs must be made. One tradeoff is made in the selection of a power supply. The type and capacity of power supply chosen in software-based routers is of crucial importance to the final price of the router. Typically lower-cost switching power supplies are specified for software-based routers in order to keep costs down. Such power supplies often have a lower power capacity than the power supplies provided in high end routers. Power supply selection may be based upon the such considerations as thermal requirements, cost, and application demands.

However, specifying lower-capacity power supplies can present problems. In order to understand the problems associated with lower-capacity power supplies in routers, some background is necessary regarding traditional telephone operation.

Figure 6:
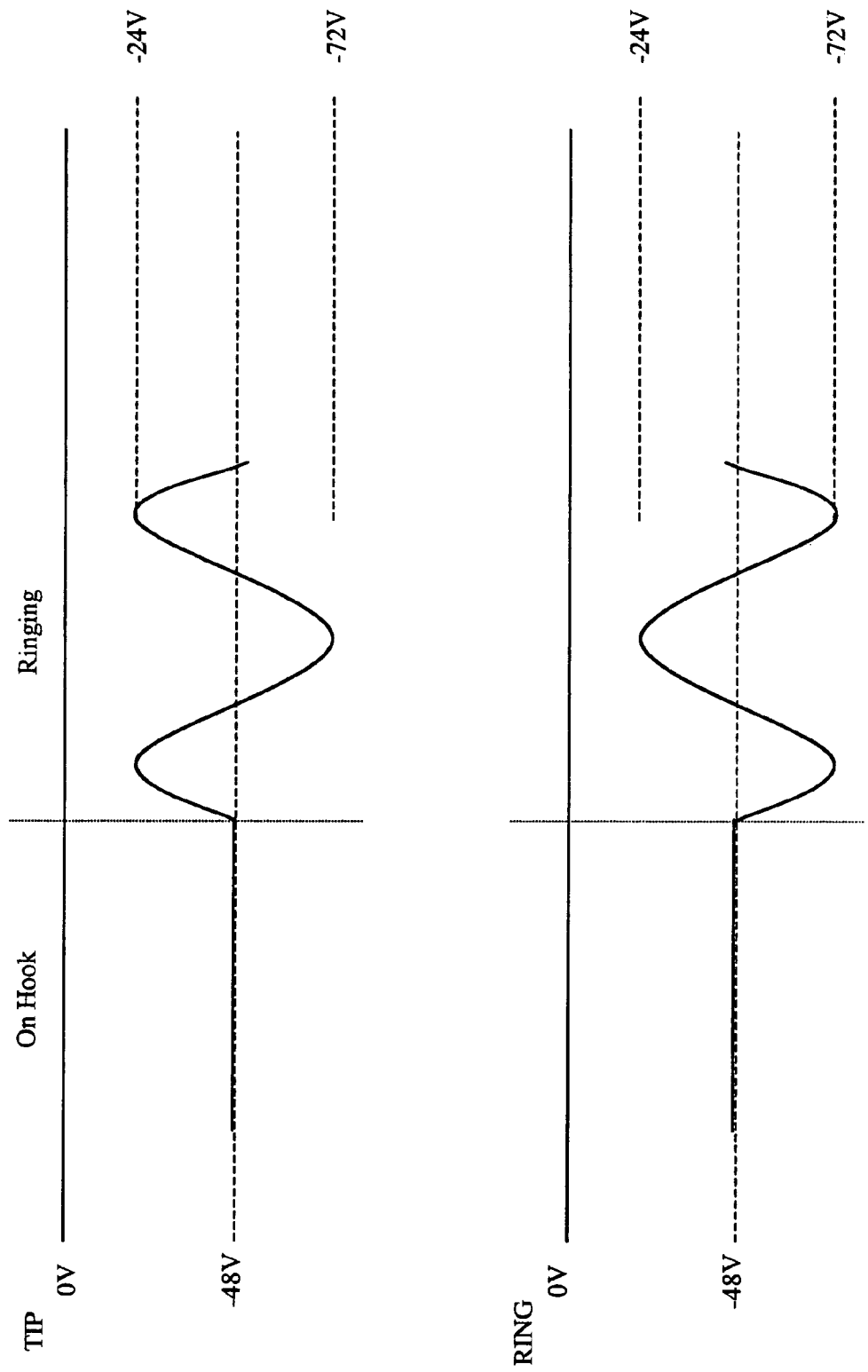

FIG. 6 is a diagram showing representative waveforms present on the tip and ring connections of a POTS phone utilizing a balanced method for ringing. When a phone is in the On Hook state, typically the tip and ring show a constant voltage between −48 and −72 Volts. In the On Hook state, little or no current is drawn by the phone. When the phone is rung and placed in a ringing state, waveforms are placed on the tip and ring connections which oscillate +/−24 Volts about −48 Volts, and which are 180° out of phase. In the ringing state, the phone draws current which is provided by a chip called SLIC (Subscriber Line Interface Card). The SLIC has a finite capacity to drive current onto the line.

The amount of current drawn by a phone has been traditionally expressed as a Ringer Equivalence Number, or REN. One REN is defined as the amount of current passing through a resistive load of 7 k Ohm coupled between the tip and ring.

One of the demands on the router's power supply is the "ring capacity" which is how many telephones can be rung at once, or how many REN may be supported at any one time. In many low-cost routers on the market, 5 REN per line may be supported by the output section of a FXS port. However, it is possible to ring more lines than the power supply may handle, causing the power supply to overload, since many routers feature 16 lines per router.

When a switching power supply overloads, typically there is no warning and the power supply simply fails. If the power supply's capacity is reached and shuts down, the router will also shut down, losing the information concerning all connections being made through the router. This will appear to users of IP telephones as dropped calls, or calls which will not go through. In addition, other data connections will be dropped as well. Loss of transaction related data means the transaction has to be revalidated. Such problems are unsatisfactory to users.

Hence, there is a need for a method and apparatus for managing the ringing of FXS ports on software-based routers which will prevent power supply overload.

SUMMARY

A method for call-limiting one or more candidate calls received by a router is disclosed. In one aspect, the method comprises: determining, by the router, whether ringing the one or more candidate calls will exceed a predetermined power limit; ringing the one or more candidate calls if ringing the candidate calls will not exceed the power limit; and not ringing the one or more candidate calls if the candidate calls will exceed the power limit.

Additional aspects include placing one or more candidate calls which exceed the power limit into a queue. Methods are disclosed for selecting the candidate calls for ringing when ringing calls will not exceed a power limit. In an additional aspect, the router may select the first candidate call in the queue to ring based on arrival time of CAS packets.

Further aspects include providing a ringing state for each candidate call. The disclosed router may set the ringing state for a candidate call to RINGING if placing the call will not exceed a power limit.

Timers may be provided for candidate calls which will exceed the power limit. The timers may be used to select candidate calls when a line becomes available.

The disclosed router may be further configured to determine whether a line has gone OFF HOOK. If a line has gone OFF HOOK, then the disclosed router may determine whether the line was previously ringing. If the line was already ringing, then the disclosed may update the line's ringing state to NOT RINGING and disregard calls which are not OFF HOOK or not previously ringing.

BRIEF DESCRIPTION OF THE DRAWING FIGURES

Figure 7:
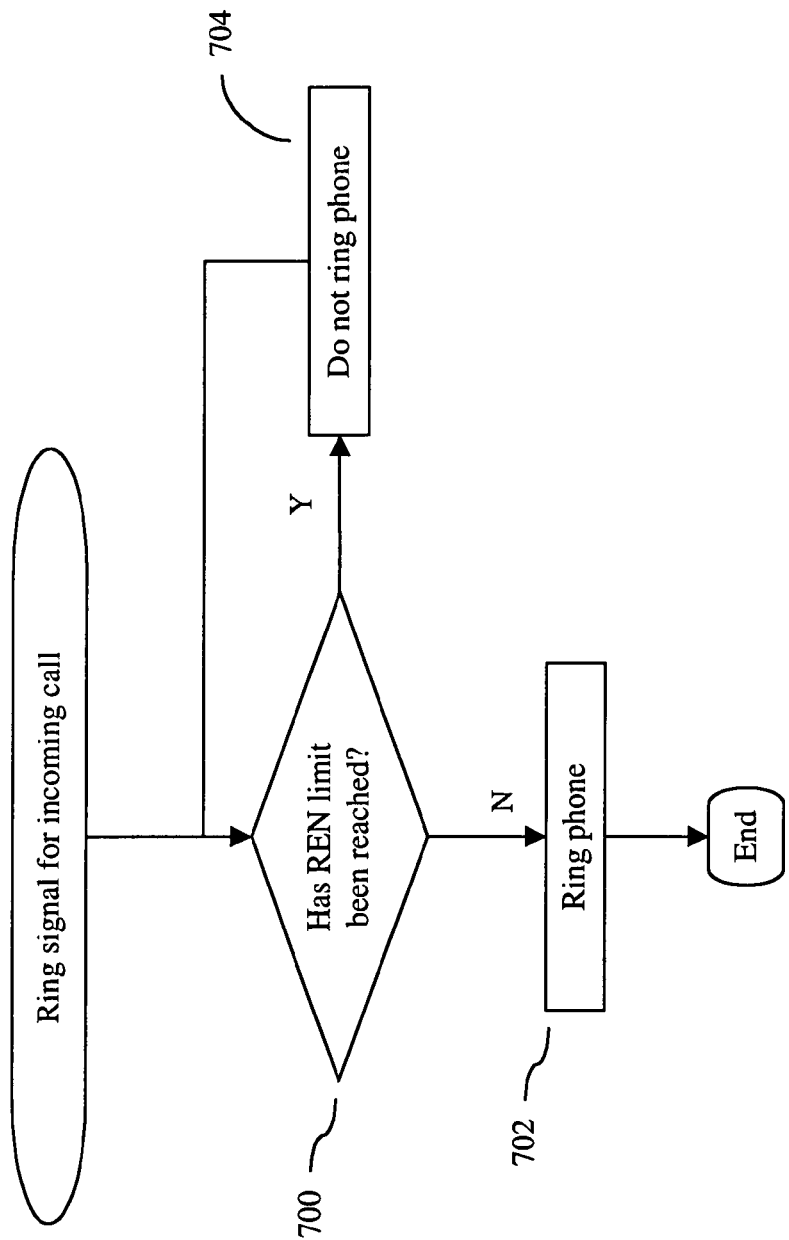
Figure 8:
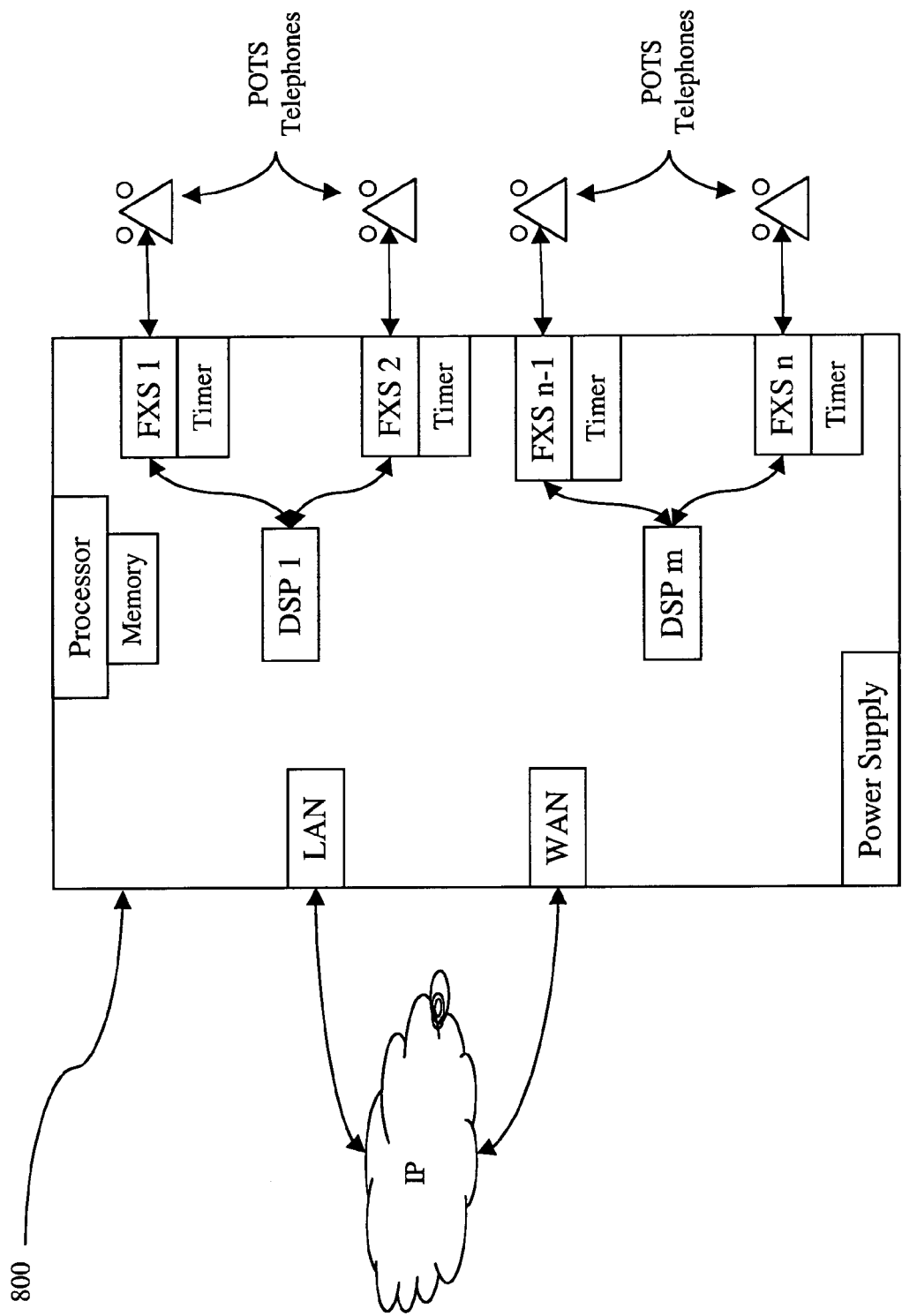
Figure 9:
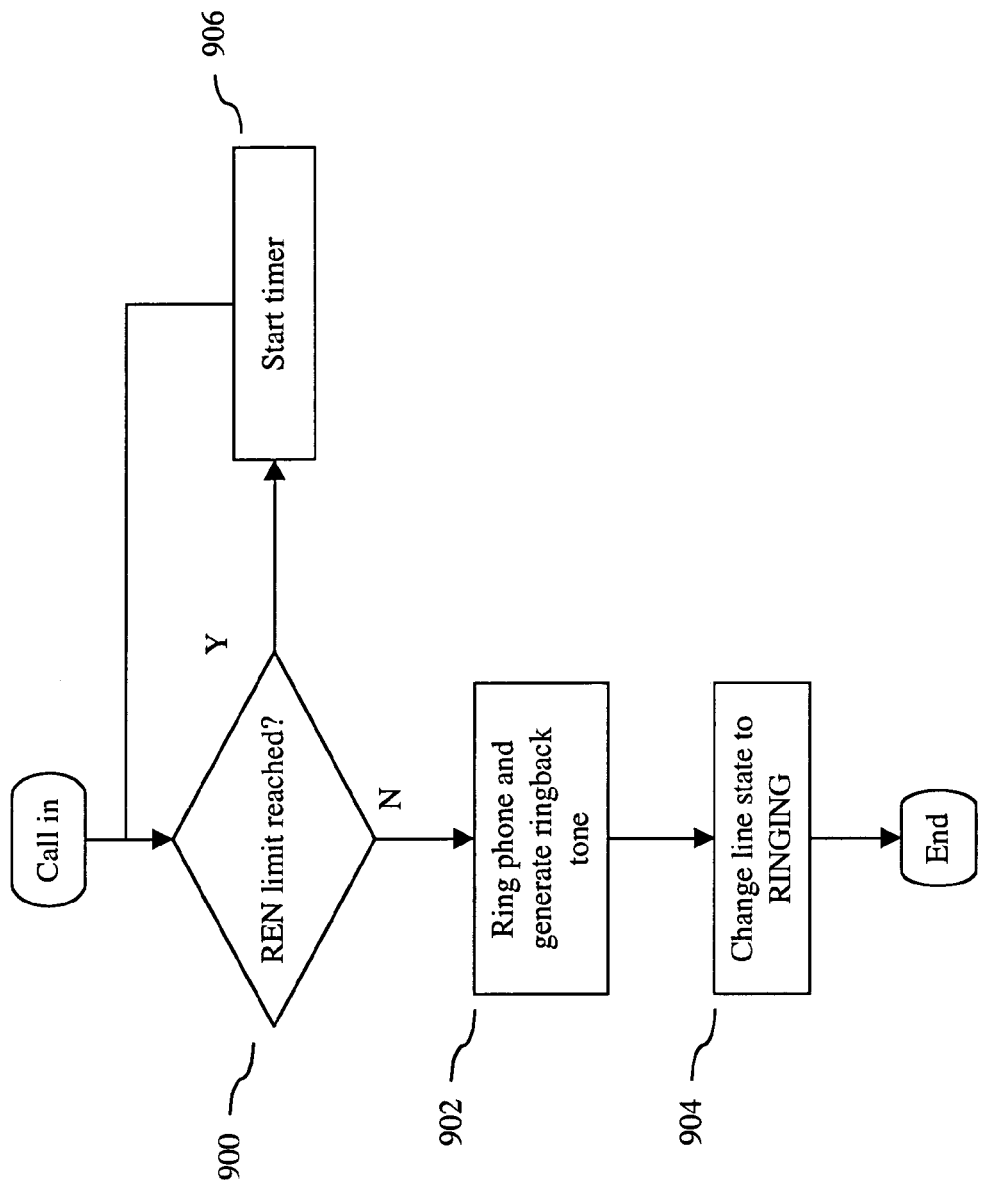
Figure 10:
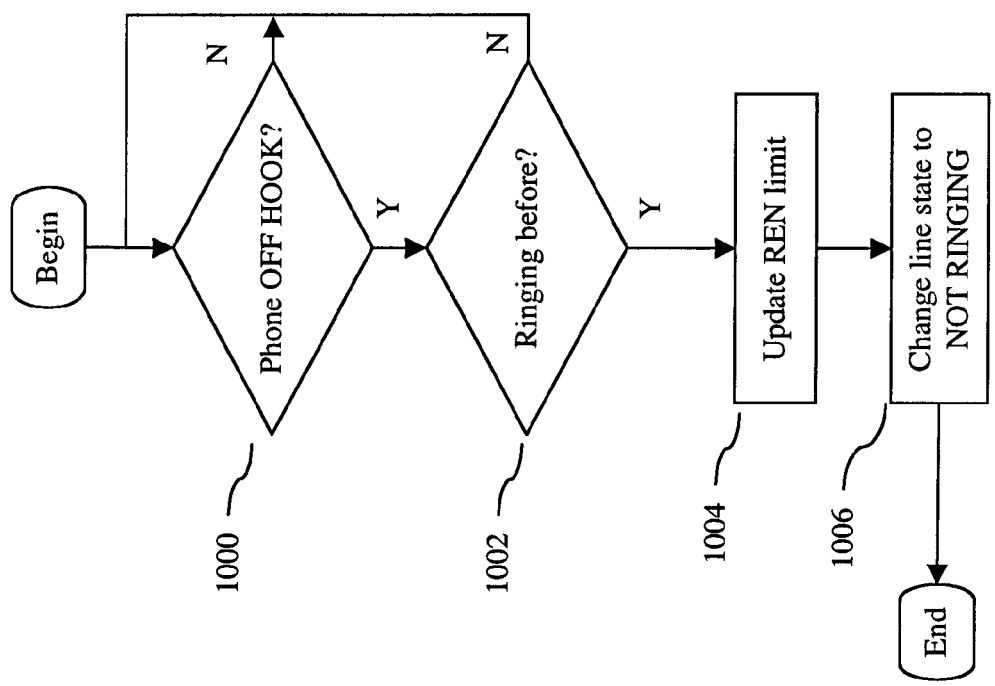
Figure 11:
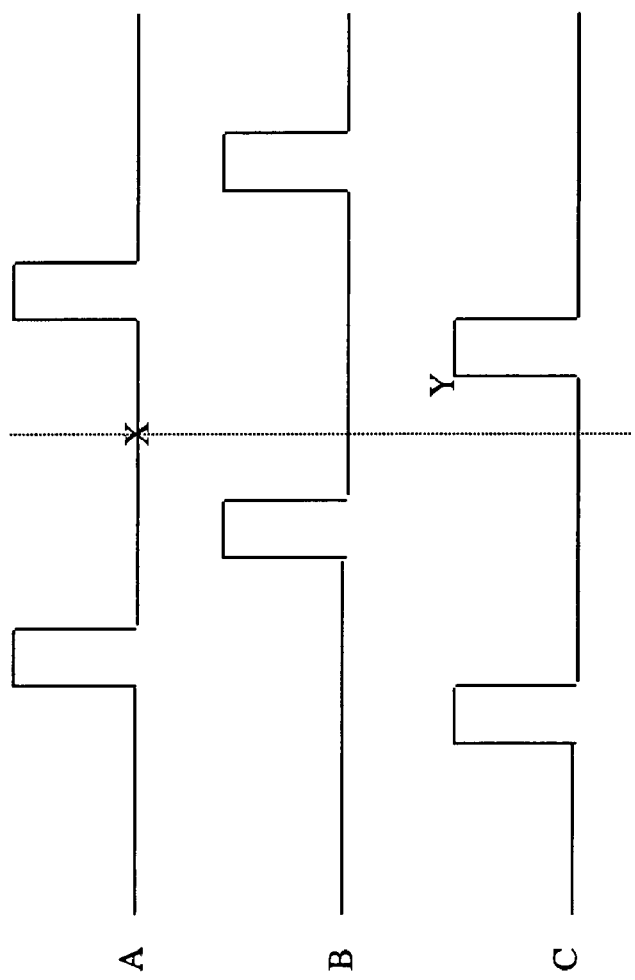

FIG. 1 is a prior art diagram of a communications system.
FIG. 2 is a prior art diagram of a communications system.
FIG. 3 is a prior art diagram of a communications system containing a router and firewall application.
FIG. 4 is a functional diagram of a prior art high-end router.
FIG. 5 is a prior art diagram of a communications system containing a low-end router.
FIG. 6 is prior art diagram showing voltage waveforms for ringing telephones.
FIG. 7 is a flowchart of one aspect of the disclosed router.
FIG. 8 is a functional diagram of a communications system containing a low-end router.
FIG. 9 is a flowchart of one aspect of the disclosed router.
FIG. 10 is a diagram showing one aspect of call selection.
FIG. 11 is a diagram showing ring cycles for incoming calls.

DETAILED DESCRIPTION

Persons of ordinary skill in the art will realize that the following description is illustrative only and not in any way limiting. Other modifications and improvements will readily suggest themselves to such skilled persons having the benefit of this disclosure.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

Overview

Referring now to FIG. 7, a flowchart of one aspect of ring limiting.

In query 700, when an incoming phone call is received and rung by a router configured in accordance with present disclosure, the router will determine whether ringing the phone will exceed a predetermined REN limit in query 700. If the REN limit will not be reached, the call will be completed and the phone rung in act 702. If the REN limit will be exceed, the phone will not be rung in act 704.

REN Limit

To accomplish ring limiting, first the maximum number of REN supported by a given FXS port must be determined.

As is appreciated by those having ordinary skill in the art, Channel Associated Signaling (CAS) is used by the PSTN to carry all signaling for a voice call. Additionally, when phones are rung, they are rung in a predetermined manner according to a country wide cadence. For example, in North America, phones ring in a pattern of 2 seconds ON, and 4 seconds OFF. This is known as the North American cadence. In PBX systems, phones will ring according to the PBX cadence, which is 1 second ON, and 3 seconds off. As anybody who has traveled to Europe knows, many different cadences exist throughout the world. More information on different cadences is available in ITU-T E. 180 Supplement 2.

In order to reduce the load on the power supply and to reduce the complexity of the disclosed router, in a preferred embodiment, phones connected to the FXS ports of routers configured in accordance with the disclosed router will be rung according to a predetermined cadence regardless of where the user is located. In one aspect of the disclosed router, the North American cadence is used. Thus, the disclosed router takes advantage of a predetermined cadence to allow ring limiting to function regardless of where an incoming call originates, or where the router is located.

It is contemplated that the one aspect of the disclosed router may be operatively coupled to a connection through a connection trunk which provides a connection for end to end signaling. When a call comes over a connection trunk, the disclosed router should not interfere with its signaling. Hence, the disclosed router may not be free to modify the ring cadence of such a call.

Similarly, cadences may be set by a system administrator to satisfy the preferences of users of the system. In this situation, the disclosed router may be configured to accept the cadence as is and check for REN limit violation in accordance with the present disclosure.

The ringing capacity of a lower-end router is a function of many design tradeoffs, including power supply selection. One non-limiting example will now be presented to illustrate the advantages of the disclosed router. As mentioned above in the prior art section, ports typically used in lower-end routers typically support 5 REN per line. Furthermore, a typical power supply in such routers may support 20 REN at one time. Thus, to avoid a power supply failure in such a router, no more than four lines should be ringing at any one time. As will be appreciated by those of ordinary skill in the art, this limit is a function of power supply choices among other design choices.

Referring now to FIG. 8, a one aspect of a disclosed router 800 is shown. Router 800 may comprise a software-based router operatively coupled to an IP cloud through a LAN or WAN as is known in the art. Router 800 may be further configured to provide voice communications to one or more POTS telephones to and from the IP cloud as is known in the art.

As is appreciated by those of ordinary skill in the art, software-based routers comprise many elements. Only those elements relevant to the present disclosure will be described to avoid obscuring the present disclsoure. Router 800 includes a processor which may comprise a Motorola® 860 Power PC. Any processor and associated hardware and software known in the art suitable for operating the router 800 may suitable for the disclosed router. Router 800 further includes memory for use with the processor. It is contemplated that any memory suitable for use with the processor may be used with the disclosed router.

Router 800 further includes one or more DSPs and one or more FXS ports. Typically, one DSP is used to interface with 2–4 FXS ports. Thus, router 800 includes a DSP 1 operatively coupled to FXS ports 1 and 2, and a DSP m operatively coupled to FXS ports n-1 and n. As can be seen by inspection of FIG. 8, each FXS port also includes a corresponding timer as will be explained in more detail below.

In one aspect of the disclosed router, the timers comprise software timers residing in the processor. The timers may comprise any software-based timers known in the art. In a further aspect of the disclosed router, the timer may comprise a software entity derived from a base hardware timer. Though FIG. 8 shows one timer for each port, the timer may also be represented as one main hardware timer cooperative with the processor. In yet a further aspect of the disclosed router, there is one active timer created by the processor per incoming call. The maximum number of timers may correspond to the number of ports.

Router 800 also includes a power supply.

In operation, when an incoming call is received by the router 800, the processor determines which DSP must ring its corresponding phone through the corresponding FXS port. The processor then instructs the DSP to ring the receiving phone.

In one aspect of the disclosed router, prior to instructing the DSP to ring a phone, the router 800 first must determine if ringing the phone will cause the power supply to fail. To accomplish this the router must first determine whether the REN limit of the router's power supply will be reached if the candidate call is allowed to ring.

FIG. 9 is a flowchart of one aspect of the disclosed router. The process illustrated in FIG. 9 is performed to determine whether a candidate call may be rung without reaching a predetermined REN limit.

The process of FIG. 9 begins with a candidate call coming in to the router in query 900. In query 900 it is determined whether ringing the candidate call will exceed a predetermined REN limit. It is contemplated that a memory space may be reserved in the router's memory for storing and recalling REN information, such as the amount of REN currently being used, and the REN limit for a particular router model.

If the REN limit will not be reached, the candidate call may proceed through the negative branch of query 900. In this case, the receiving phone may be rung in act 902, and the router may also generate and send ring-back tone voice packets to the caller as is known in the art.

To keep track of ringing activity, it is contemplated that each line may have a ringing state associated therewith. The ringing state may be stored in, and retrieved from, the router's memory. When the router is powered up or reset, the ringing state of each line may be reset to a known state such as NOT RINGING. In act 904, since a phone is now ringing, the corresponding phone's ringing state will now be set to RINGING.

If the candidate call will exceed the REN limit, the process will pass through the positive branch of query 900. There, in act 906, the candidate call will be placed in a queue and a corresponding timer is started for the candidate call. In a preferred embodiment, the timer comprises a timer chosen to minimize CPU cycles consumed. The timer may be further configured to determine whether a candidate caller has hung up. In one aspect of the disclosed router, a 4 second timer standard in the art has been found suitable for use.

As is known by those of ordinary skill in the art, under CAS a hang-up is determined when too much time has elapsed between ring signals. Thus, the disclosed router is preferably configured to determine when such a time period has elapsed. The disclosed router may be configured to check for hang-ups over intervals between 200 ms and 10 sec. In one aspect of the disclosed router, the router may check for hang-ups in intervals of 4 seconds. Such an interval should be satisfactory to be compatible with the various ring cadences around the world. It is contemplated that this determination may be made by the router's processor. If more than one call is pending, a plurality of timers may be running, and the processor may be informed when a timer has stopped. The processor may then interpret this to be a call which has hung up. Once a caller has hung up, that line may have its ringing state reset to NOT RINGING.

After the timer is set in act 906, the process returns to query 900 to see whether the call may now be processed.

It is contemplated that the disclosed router may need to periodically update the REN limit as calls are received and finished.

FIG. 10 is a flowchart of another aspect of the disclosed router whereby the REN limit may be updated.

In query 1000, the disclosed router waits until a phone goes OFF HOOK. Once an OFF HOOK phone is sensed, the process proceeds through the positive ranch of query 1000 into query 1002. There, the disclosed router determines whether the phone was already ringing. To do this, the router queries the RINGING state to determine whether the state of the line is RINGING or NOT RINGING. If the line is OFF HOOK and is not ringing, the call must be an outgoing call. As outgoing calls do not affect the REN limit, these lines may be disregarded and the process returns to the beginning through the negative branch of query 1002.

If the call was ringing before, the REN limit will then be updated in act 1004. The state for this line will then be set to NOT RINGING in act 1006. Since the line was previously ringing and is now OFF HOOK, the phone has been answered and is no longer ringing.

As is known by those of ordinary skill in the art, lines which are not ringing do not consume RENs as the ringer is the primary consumer of current. However, some current is being drawn when the line is off-hook and a call is in progress, but this amount of current is negligible compared to the current drawn by the ringer when in the ringing state.

It is contemplated that the disclosed router will have to impose ring limiting, thus causing calls not to be forwarded. A process for dealing with calls not forwarded will now be disclosed.

In the example described above, an exemplary lower-end router was shown which had a call limit of four. Thus, if a fifth line is ringing, the disclosed router will not ring the line. It is contemplated that the router processor will be configured to manage the calls, as the DSP only knows which of its local lines it is ringing, and is not aware of other DSP actions.

If a call is not forwarded, the callers are placed in a queue. While the callers are in queue, the router will preferably keep sending a ring-back. Thus, to a caller in queue, they only perceive that their call is not being answered. In one aspect of the disclosed router, the queue will be administered by the router's processor.

At some point, a free line may be available and the call may be able to be rung without exceeding the REN limit. It would be natural to assume that the oldest call in queue should be connected first. However, the inventor has determined that this is not the most advantageous procedure.

In one aspect of the disclosed router, the oldest call is not necessarily connected first. Rather, calls are preferably connected in the order they appear in a ring cycle. In a further aspect of the disclosed router, calls that ring first in the ring cycle are connected first. In other words, calls compete for access in their order of arrival for each ring cycle. Once the called line acquires a ringer, it has it until either the call is terminated, e.g., the called line goes off-hook or the caller hangs up.

Referring now to FIG. 11, a diagram of ring cycles for incoming calls is shown along a common time axis. Waveform A represents a call that is currently OFF HOOK. Waveform B and C represent calls currently in queue. At time marker X, call A goes ON HOOK, thereby freeing space for a call to go through. At that instant, a free ring cycle is opened. In a preferred embodiment, the next line which rings will be selected to be taken out of the queue and forwarded. Thus, in FIG. 11, call C will be selected at time marker Y. This is the case even if call B has been in queue longer than call C.

In another aspect of the disclosed router, only the ringing lines are placed into a queue, and lines not ringing compete for a spot in a ringing queue every time a RING CAS signal arrives. In this aspect, the timer is trying to knock lines off the Ringing queue because a RING CAS has not arrived from the caller for a relatively long time, for example 4 seconds.

A call selection process configured according to the present disclosure is advantageous for several reasons. First, no arbitration protocols are needed which will consume processor time. Since the disclosed router may be software-based, avoiding further demands on the processor is desirable.

Furthermore, taking calls in the order in which they appear may actually delay responses, while clearing the queue according to the present disclosure actually speeds up call answering. As can be seen from FIG. 11, since call B is in the early portion of its off time in the ring cadence, there would be a delay of nearly four seconds before the called party would hear the ring. By choosing the first call to ring, the disclosed router in fact routes the first call able to be answered.

While embodiments and applications have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A method for ringing a telephone connected to a routing system comprising:
   receiving a candidate call for said telephone;
   determining whether ringing said telephone for said candidate call exceeds a predetermined power limit;
   inserting said candidate call into a ring queue responsive to a determination that said ringing exceeds said power limit; and
   ringing said candidate call from said ring queue responsive to power being available to ring said telephone.

2. The method of claim 1 further comprising:
   selecting one of a plurality of candidate calls in said ring queue responsive to ringing of another candidate call being terminated;
   determining whether ringing a telephone for said one of said plurality of candidate calls will exceed said predetermined power limit; and
   ringing said call responsive to a determination that ringing said telephone does not exceed said predetermined power limits.

3. The method of claim 1 wherein said step of determining whether ringing said telephone exceeds said predetermined power limit further comprising:
   determining an amount of power required to ring said telephone;
   comparing said amount of power required to power available for ringing; and
   determining said ringing exceeds said predetermined power limit is responsive to said amount of power required being greater than said power available.

4. The method of claim 3 wherein said step of determining whether ringing said telephone exceeds said predetermined power limit comprises:
   determining a total amount of power available for ringing; and
   subtracting an amount of power required for ringing for each of a plurality of candidate calls being rung from said total amount of power available to determine said power available.

5. The method of claim 1 wherein said predetermined power limit is a predetermined Ring Equivalent Number, said method further comprising:
   determining said predetermined Ring Equivalent Number for said router.

6. The method of claim 1 further comprising:
   maintaining a ring state in memory for each telephone connected to said router.

7. The method of claim 6 further comprising:
   determining said ring state for said telephone receiving said candidate call responsive to receiving said candidate call; and
   dropping said candidate call responsive to a determination that said ring state is RINGING.

8. The method of claim 1 further comprising:
   maintaining a timer for said candidate call in said ring queue.

9. The method of claim 8 further comprising:
   determining whether said candidate call has hung up responsive to said timer expiring.

10. The method of claim 1 further comprising:
    generating ring back tone voice packets responsive to receiving said candidate call; and
    transmitting said ring back tone voice packets to a calling telephone of said candidate call.

11. A program storage device readable by a machine, tangibly embodying a program of instructions executable by a processing system in a routing system to perform a method for call-limiting one or more candidate calls received by said routing system, said method comprising:
    receiving a candidate call for said telephone;
    determining whether ringing said telephone for said candidate call exceeds a predetermined power limit;
    inserting said candidate call into a ring queue responsive to a determination that said ringing exceeds said power limit; and
    ringing said candidate call from said ring queue responsive to power being available to ring said telephone.

12. The method of claim 11 further comprising:
    selecting one of a plurality of candidate calls in said ring queue responsive to ringing of another candidate call being terminated;
    determining whether ringing a telephone for said one of said plurality of candidate calls will exceed said predetermined power limit; and
    ringing said call responsive to a determination that ringing said telephone does not exceed said predetermined power limits.

13. The method of claim 11 wherein said step of determining whether ringing said telephone exceeds said predetermined power limit further comprising:
    determining an amount of power required to ring said telephone;
    comparing said amount of power required to power available for ringing; and
    determining said ringing exceeds said predetermined power limit is responsive to said amount of power required being greater than said power available.

14. The method of claim 13 wherein said step of determining whether ringing said telephone exceeds said predetermined power limit comprises:
    determining a total amount of power available for ringing; and
    subtracting an amount of power required for ringing for each of a plurality of candidate calls being rung from said total amount of power available to determine said power available.

15. The method of claim 11 wherein said predetermined power limit is a predetermined Ring Equivalent Number, said method further comprising:
    determining said predetermined Ring Equivalent Number for said router.

16. The method of claim 11 further comprising:
    maintaining a ring state in memory for each telephone connected to said router.

17. The method of claim 16 further comprising:
    determining said ring state for said telephone receiving said candidate call responsive to receiving said candidate call; and
    dropping said candidate call responsive to a determination that said ring state is RINGING.

18. The method of claim 11 further comprising:
    maintaining a timer for said candidate call in said ring queue.

19. The method of claim 18 further comprising:
determining whether said candidate call has hung up responsive to said timer expiring.

20. The method of claim 11 further comprising:
generating ring back tone voice packets responsive to receiving said candidate call; and
transmitting said ring back tone voice packets to a calling telephone of said candidate call.

21. An apparatus for ringing call received by a routing system comprising:
means for receiving a candidate call for said telephone;
means for determining whether ringing said telephone for said candidate call exceeds a predetermined power limit;
means for inserting said candidate call into a ring queue responsive to a determination that said ringing exceeds said power limit; and
means for ringing said candidate call from said ring queue responsive to power being available to ring said telephone.

22. The apparatus of claim 21 further comprising:
means for selecting one of a plurality of candidate calls in said ring queue responsive to ringing of another candidate call being terminated;
means for determining whether ringing a telephone for said one of said plurality of candidate calls will exceed said predetermined power limit; and
means for ringing said call responsive to a determination that ringing said telephone does not exceed said predetermined power limits.

23. The apparatus of claim 21 wherein said means of determining whether ringing said telephone exceeds said predetermined power limit further comprising:
means for determining an amount of power required to ring said telephone;
means for comparing said amount of power required to power available for ringing; and
means for determining said predetermined power limit is exceed responsive to said amount of power required being greater than said power available.

24. The apparatus of claim 23 wherein said means for determining whether ringing said telephone exceed said predetermined power limit comprises:
means for determining a total amount of power available for ringing; and
means for subtracting an amount of power required for ringing for each of a plurality of candidate calls being rung from said total amount of power available to determine said power available.

25. The apparatus of claim 21 wherein said predetermined power limit is a predetermined Ring Equivalent Number, said method further comprising:
means for determining said predetermined Ring Equivalent Number for said router.

26. The apparatus of claim 21 further comprising:
means for maintaining a ring state in memory for each telephone connected to said router.

27. The apparatus of claim 16 further comprising:
means for determining said ring state for said telephone receiving said candidate call responsive to receiving said candidate call; and
means for dropping said candidate call responsive to a determination that said ring state is RINGING.

28. The apparatus of claim 21 further comprising:
means for maintaining a timer for said candidate call in said ring queue.

29. The apparatus of claim 18 further comprising:
means for determining whether said candidate call has hung up responsive to said timer expiring.

30. The method of claim 11 further comprising:
means for generating ring back tone voice packets responsive to receiving said candidate call; and
means for transmitting said ring back tone voice packets to a calling telephone of said candidate call.

* * * * *